Jan. 14, 1958  H. M. GAMMON  2,819,706
VALVE ROTATING DEVICE
Filed Sept. 30, 1955  3 Sheets-Sheet 1
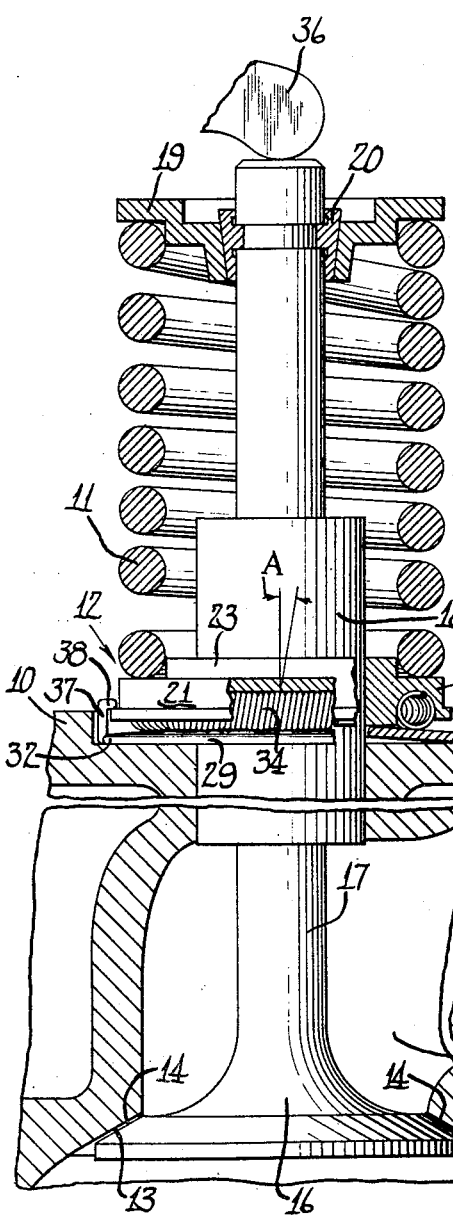
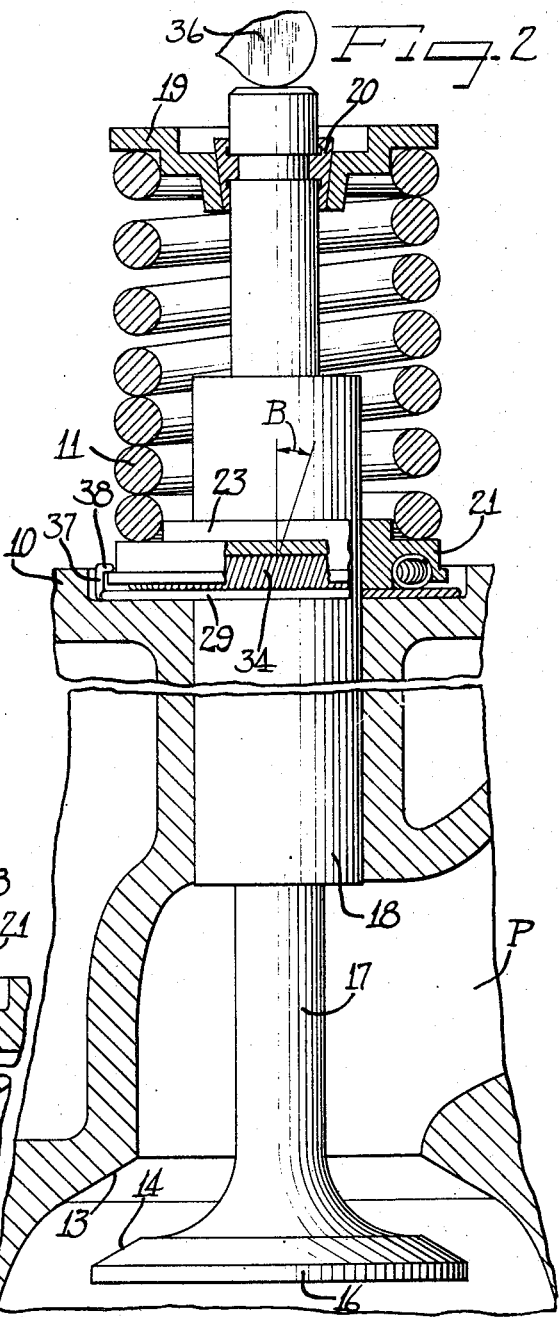
Inventor
Howard M. Gammon Jan. 14, 1958 H. M. GAMMON 2,819,706
VALVE ROTATING DEVICE
Filed Sept. 30, 1955 3 Sheets-Sheet 2
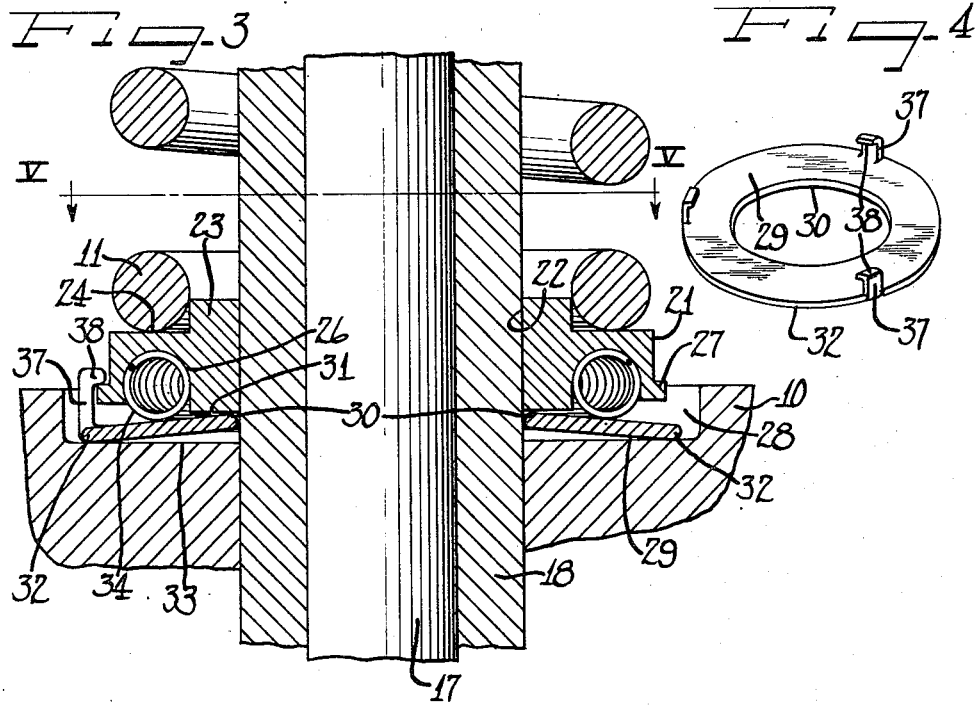
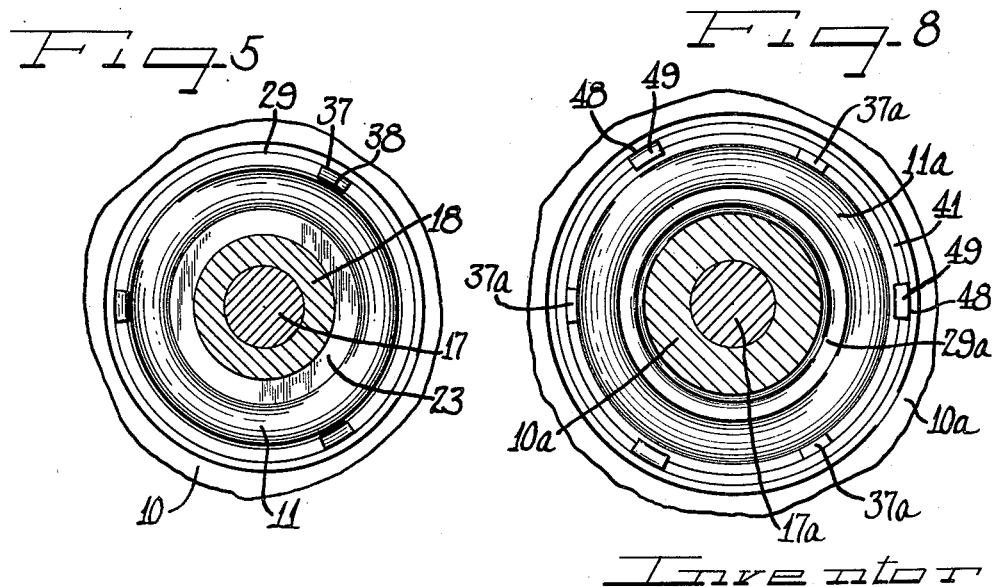
Inventor
Howard M. Gammon

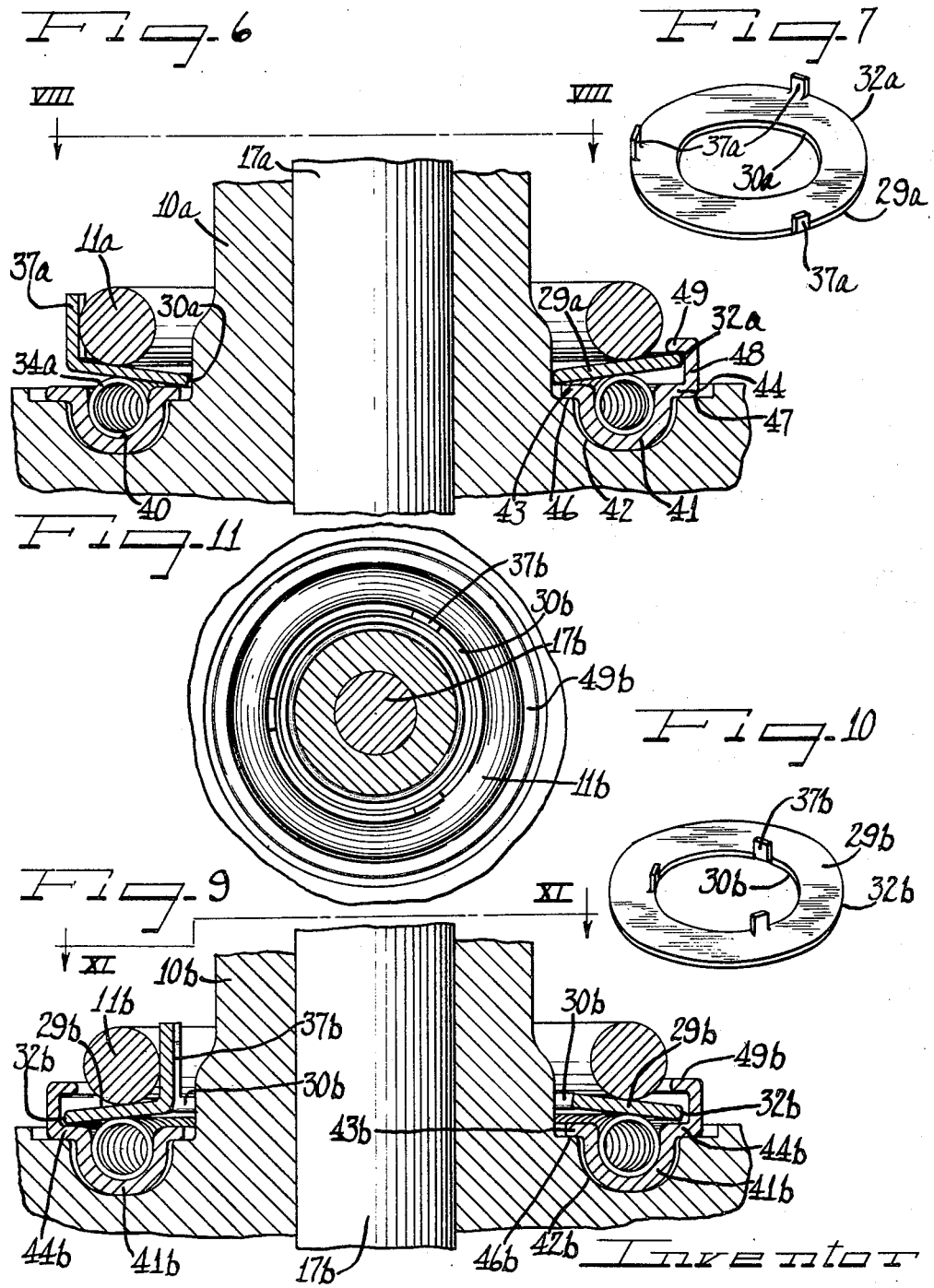

United States Patent Office 2,819,706
Patented Jan. 14, 1958

2,819,706
VALVE ROTATING DEVICE

Howard M. Gammon, Claridon Township, Geauga County, Ohio, assignor to Thompson Products, Inc., Cleveland, Ohio, a corporation of Ohio Application September 30, 1955, Serial No. 537,814

16 Claims. (Cl. 123—90)

This invention relates generally to a device for rotating two axially adjacent parts in response to varying axial loads and more particularly relates to a valve rotating device wherein two separated axially loaded relatively rotatable parts of a poppet valve assembly are interconnected by a load transferring means and a spring providing helically wound coils arranged to transmit forces transversely of the spring coils and moving said load transferring means out of engagement with one of the parts under increased load whereupon the coil will tilt to rotatably drive the parts with respect to one another. One of the specific features of the present invention resides in the utilization of a load transferring means taking the form of a spring washer having offset lug portions at one of the extremities thereof for engaging and adjoining one of the axially loaded parts, thereby to insure accurate axial alignment between the parts and the load transmitting means.

Although the principles of the present invention are of generally utility, a particularly useful application is found in connection with the provision of valve rotating devices. It is highly desirable to provide means for rotating engine valves since cyclic rotation of the valve during the course of operation thereof assists in eliminating valve burning as well as wearing, pitting and stem-galling and scoring.

It is an object of the present invention to provide a valve rotating device which utilizes a reduced number of simplified parts that are inexpensive to make and which are easily fabricated and conveniently assembled.

Yet another object of the present invention is to provide a valve rotating device which constitutes a compact assembly having great utility either as a replacement unit or as new equipment in contemporary valve equipped engines.

Another object of the present invention is to provide a valve rotating device of the type utilizing as a shiftable means, a spring providing helically wound coils transmitting forces transversely of the coiling axis and cooperating with a spring washer having retaining means formed at the extremities thereof for insuring proper alignment of the valve rotator components.

Many other features, advantages and additional objects of the present invention will become manifest to those versed in the art upon making reference to the detailed description which follows and the accompanying sheets of drawings in which a preferred structural embodiment of a valve rotating device incorporating the principles of the present invention is shown by way of illustrative example.

Figure 1 is a cross sectional view with parts shown in elevation and with parts broken away illustrating a rotating device according to the principles of the present invention installed in the poppet valve assembly of an internal combustion engine and with the valve closed.

Figure 2 is a view similar to Fig. 1 but showing the various components repositioned with the valve open.

Figure 3 is an enlarged fragmentary cross sectional view taken in the same plane as Figs. 1 and 2 but showing additional details of construction of the valve rotating device.

Figure 4 is an isometric view of the spring washer utilized in the embodiment of Figs. 1, 2 and 3.

Figure 5 is a somewhat reduced fragmentary cross sectional view of parts shown in elevation taken substantially on line V—V of Fig. 3.

Figure 6 is a fragmentary cross sectional view similar to the view of Fig. 3 but showing an alternative embodiment of valve rotating device as provided in accordance with the principles of the present invention.

Figure 7 is an isometric view of the spring washer incorporated in the embodiment of Fig. 6.

Figure 8 is a fragmentary cross sectional view with parts shown in elevation taken generally on line VIII—VIII of Fig. 6.

Figure 9 is a fragmentary cross sectional view with parts shown in elevation taken generally on the plane of the view of Figs. 3 and 6 but showing another alternative embodiment in accordance with the principles of the present invention.

Figure 10 is an isometric view of the spring washer incorporated in the embodiment of Fig. 9.

Figure 11 is a fragmentary cross sectional view with parts shown in elevation taken substantially on line XI—XI of Fig. 9.

As shown on the drawings:

Referring first to all to Figs. 1 and 2, it will be noted that axially adjacent relatively rotatable parts are provided which include, respectively, an engine part indicated at 10 and a valve indicated at 16. The valve rotating device of the present invention is indicated generally by the reference numeral 12 and includes additional components which are interposed between the two relatively rotatable parts for concurrent relative movement therewith.

Those versed in the art will readily understand that the principles of the present invention are generally applicable to any structurally related relatively rotatable parts, but for purposes of illustration, the principles of the present invention are disclosed in the environment of a poppet valve assembly such as may be employed in an internal combustion engine or the like and wherein the valve rotating device 12 is applied at the end of a valve stem.

In the embodiment of Figs. 1 and 2, an engine part 10 provides a port P having a valve opening 13 presenting a beveled valve seat regulated by the correspondingly beveled seating surface 14 of a valve head 16 carried on the end of a valve stem 17.

The stem 17 is slidably carried in the engine part 10 by means of a valve stem guide 18. The valve spring 11 comprises a helically wound coil spring bottomed at one end against a valve spring retainer cap 19 locked to the end of the stem 17 by means of valve cap retainer means indicated at 20.

For purposes of this disclosure, the valve spring 11 may be considered as having two positions of compression, namely, a first position illustrated in Fig. 1 where the spring 11 is in light compression, as when the valve 16 is closed on the seat 13, and the second when the valve 16 is in the open position such as is shown in Fig. 2.

In the form of the invention illustrated in Figs. 1–5 the opposite end of the valve spring 11 is bottomed against an annular collar member 21. The collar member 21 has a central opening 22 to facilitate slidable assembly on the valve stem guide 18. On the top surface of the collar member 21, there is provided an angular axially projecting boss 23 which extends into the coils of the valve spring 11, thereby piloting the coils of the spring 11 into seated engagement against an annular abutment surface indicated at 24.

On the lower surface of the collar member 21 there is provided an annular trough shaped recess 26 which is located concentrically inwardly of an annular radially outwardly extending flange 27.

The engine part 10 has an annular recess 28 receiving parts of the valve rotating device 12. Interposed between the collar member 21 and the engine part 10 is a load transferring means which takes the form of a generally conical spring washer 29 having an inner peripheral edge 30 engaging the bottom surface 31 of the collar member 21 and having an outer peripheral edge 32 engaging a wall 33 provided at the bottom of the recess 28 in the engine part 10. The conical spring washer 29 operates to transmit normal spring load between the engine part 10 and the collar member 21.

In accordance with the principles of the present invention, spring means 34 provide a plurality of helically wound coils received in the trough shaped recess 26 of the collar member 21. The coils are disposed to engage the bottom of the recess 26 and one side of the spring washer 29 whereby forces will be transmitted transversely of the coiling axis of the helically wound coils.

The spring means 34 can be a band spring with the ends joined by any suitable form of fastener, or can take the form of one or more closed C shaped springs held in place in the recess 26. In any event, the spring means 34 provide a plurality of coils which are circumferentially spaced apart from one another and which are so arranged as to transmit forces in a transverse direction relative to the center axis thereof since opposite sides of each loop or coil of the spring means 34 are arranged to contact the spring washer 29 and the collar member 21.

Because of the multiplicity of coils in the spring means 34, there is sufficient stiffness so that the spring will act like a solid ring and will compress the conical spring washer 29 when an increased pressure is placed on the valve spring 11 due to the valve stem 17 being driven by a rocker arm 36 (Figs. 1 and 2) of a valve actuating means operatively engaged with the end of the valve stem 17.

Thus, when the valve 16 is pressed open and away from seat 13, the increased amount of axial force, which increases due to the compression of the spring 11, will apply greater and greater pressure between the outer edge of the conical spring washer 29 and the spring means 34 until the conical spring washer 29 begins to flatten out. When this occurs, the inner edge 30 of the conical spring washer 29 is raised off of its seat on the surface 31 of the collar member 21, thus relieving the restriction against rotation which is ordinarily imposed between the valve spring 11 and the engine part 10 by virtue of the interrelationship effected by the conical spring washer 29.

The restriction against rotation having been relieved, the individual coils of the spring means 34 tend to be transversely compressed or tilted over. In other words, the normal disposition of the individual coils in the position of Fig. 1 where the valve 16 is just barely being moved away from the seat 13, is indicated by the angle A, an angle which would be normally approximately the same as the helix angle of the spring means or coils 34. However, when the individual coils tip or are tilted, the coils are disposed at an angle indicated in Fig. 2 at B. The angles A and B are measured with respect to a vertical axis passing through the valve stem 17.

Because of the helically continuous winding of the spring means 34, all of the coils will tilt in the same direction and a relative translation will occur between the opposite sides of each individual coil. Since the opposite sides of each individual coil are in contact, respectively, with the collar member 21 or with the spring washer 29, a relative rotation will occur by virtue of the driving action imparted between the parts and to the parts by the spring means 34.

It will also be apparent that when the coils of the spring means 34 tip over with respect to one another, the transverse thickness of the spring means 34 is also diminished as is indicated in Fig. 2. This decrease in thickness of the spring means 34 lessens the axial spacing dimension between the wall 33 of the recess 28 in the engine part 10 and the bottom surface 31 of the collar member 21. Thus, the inner edge 30 of the spring washer 29 will again be seated against the bottom surface 31 of the collar member 21. Consequently, the relatively rotatable parts will again be locked against further rotation until the valve spring 11 is further compressed and the entire cycle is repeated.

It will be understood that when the valve is again closed, the cycle will be completed through an expansion of the valve spring 11, thereby effecting an unloading action on the relatively rotatable parts. When the parts are unloaded, the spring means 34 will again resume normal shape and the spring washer 29 will again resume its normal conical position with the inner and outer edges spaced axially and engaging the respective parts.

It will be noted that the present invention contemplates the provision of the embodiment of Figs. 1–5 with no special retaining collars. Rather, the spring washer 29 is seated directly against the wall 33 of the engine part 10.

It is a feature of the present invention, therefor, that the spring washer 29 be especially constructed to facilitate proper alignment between the related components of the valve rotating device. Referring specifically to Figs. 3 and 4, it will be noted that the outer peripheral edge 32 of the spring washer 29 is particularly characterized by a plurality of upstanding lugs 37 flanged as at 38 to overlie the flange 27 formed on the collar member 21. The lugs 37 are circumferentially spaced at equal intervals around the annular spring washer 29. Thus, the flanged lugs 37 not only function to lock the assembly together but restrain the parts against relative lateral displacement and insure proper axial alignment of the axially loaded parts.

In the form of the invention illustrated in the embodiment of Figs. 6, 7 and 8, the valve stem is indicated at 17a reciprocable in an engine part 10a and an annular recess is provided as at 40 to receive the helically wound coils of a spring means 34a. If desired, the spring means 34a may be received within a trough shaped recess 40 provided by a separate retainer member 41 generally annular in configuration and seated within a correspondingly shaped recess 42 formed in the engine part 10a. As illustrated, the retainer member 41 in cross section is generally U-shaped having outwardly extending flanges 43 and 44 seating on adjoining abutment surfaces 46 and 47 respectively. The flange 44 has a plurality of upstanding lugs 48 flanged as at 49 to overlie the outer peripheral edge 32a of a spring washer 29a.

The spring washer 29a has an inner peripheral edge 40a seated on the flange 43 of the retainer member 41. The lower side of the spring washer 29a engages against one side of the coils of the spring means 34a while the opposite side of the spring washer 29a seats one end of the valve spring 11a.

At the outer peripheral edge 32a on the spring washer 29a, there are provided a plurality of circumferentially spaced upstanding lugs 37a which serve to pilot the coils of the valve spring 11a, thereby maintaining the axially adjacent parts in proper alignment.

In the embodiment of Fig. 6, the inner edge 30a of the spring washer 29a operates as the restriction against rotation between the engine part and the valve spring during normal spring loading, however, under increased axial load, the inner edge 30a is moved away from engagement because the spring washer 29a is bowed over the coils of the helical spring means 34a.

The increased axial load is thus transmitted between the parts via the coils of the spring means 34a and the coils will tilt or tip to rotatably drive the parts with respect to one another.

The embodiment of Fig. 9 is generally similar to that described in connection with Figs. 6, 7 and 8 and, accordingly, reference numerals with the suffix B but of corresponding numbers have been applied to the structural elements of Figs. 9, 10 and 11 wherever possible. Note particularly that the spring washer 29b in the embodiment of Figs. 9, 10 and 11 has an outer edge 32b which engages the flange 44b of the retainer 41b, thereby operating as a restriction against rotation between the engine part 10b and the valve spring 11b. Moreover, ordinary spring loads are transmitted between the engine part 10b through the edge portion 32b, the spring washer 29b and to the valve spring 11b.

The outer edge of the retainer 41b is flanged as at 49b to confine the spring washer 29b. At the inner edge 30b of the spring washer 29b, there is provided a plurality of upstanding tabs or tangs or lugs 37b extending into the coils of the spring 11b and serving to pilot the coils of the spring 11b into proper axial alignment with respect to the other parts of the valve rotating device.

It will be noted that the spring washers of the embodiments of Figs. 6–11 operates as a lever means between the coils and one of the parts with the extremity of the lever engaging the other part, thereby transmitting normal loading directly through the lever means and restricting the parts against relative rotation. The lever extremity is moved upon increased loading and the coils tilted to rotatably drive the parts.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. A valve rotating device comprising a conical spring washer having axially spaced inner and outer edges, a spring means providing helically wound coils engaging one side of said spring washer between said edge portions, and first and second parts to be rotated, one of said edges of said spring washer engaging one of said parts, the other of said parts engaging the opposite side of spring washer between said edge portions, said spring washer having confining means for keeping said spring washer and the other of said parts in engagement with one another, said coils arranged to transmit forces transversely of said spring coils and moving said one of said edges out of engagement with said of one of said parts under increased load whereupon said coils will tilt to rotatably drive the first and second parts with respect to one another.

2. A valve rotating device comprising a spring washer having opposite parallel first and second surfaces extending between axially spaced inner and outer edges, a spring means providing helically wound coils engaging one side of said spring washer against said first surface and between said edge portions, a valve spring bottomed at one end against the other side of said spring washer and against said second surface between said edges, retainer means for said spring means, one of said edges of said spring washer engaging said retainer means, but moving away for disengagement therefrom under increased load whereupon said coils will tilt to effect relative rotation between said retainer means and said valve spring.

3. A valve rotating device as defined in claim 1, said confining means on said spring washer constituting lug means confining said spring washer and said other of said parts for engagement with one another.

4. A valve rotating device as defined in claim 3, said one of said edges constituting the inner edge of said spring washer and said lug means constituting a plurality of circumferentially spaced upstanding tabs on the outer edge of said spring washer.

5. A valve rotating device as defined in claim 3, said one of said edges constituting the outer edge of said spring washer and said lug means constituting a plurality of circumferentially spaced tabs on the inner edge of said spring washer.

6. A valve rotating device as defined in claim 2, and a plurality of circumferentially spaced lugs on the other of said edges of said spring washer forming a pilot portion for guiding the valve spring.

7. A valve rotating device as defined in claim 6, said lugs being on the outside edge of said spring washer and said inside edge of said spring washer engaging said retainer means.

8. A valve rotating device as defined in claim 6, said lugs being on the inside edge of said spring washer and said outside edge of said spring washer engaging said retainer means.

9. In combination, two axially loaded parts, load transmitting means between said parts restricting said parts against rotation and constituting a lever means engaging an adjoining one of said parts and being constructed to insure axial alignment between the parts and the load transmitting means, spring means between said parts providing a large number of coils each arranged to transmit a portion of the load transversely of the spring and between the parts, said coils engaging said load transmitting means to remove the restriction against rotation in response to increased axial load on the parts, whereupon said coils will tip to rotatably drive one part with respect to the other.

10. A valve rotating device comprising a valve spring and a second poppet valve assembly part comprising two axially loaded parts, load transmitting means between said parts restricting said parts against rotation and constituting a lever means constructed to engage an adjoining one of said parts and to insure axial alignment between the parts and the load transmitting means, spring means between said parts providing a large number of coils each arranged to transmit a portion of the load transversely of the spring and between the parts, said coils engaging said load transmitting means to remove the restriction against rotation in response to increased axial load on the parts, whereupon said coils will tip to rotatably drive one part with respect to the other.

11. A valve rotating device as defined in claim 10, said lever means comprising an annular spring washer having an outer edge engaging said second part and having upstanding lugs formed on the inner edge thereof piloting said valve spring.

12. A valve rotating device as defined in claim 10, said lever means comprising an annular spring washer having an inner edge engaging said inner part and having upstanding lugs formed on the outer edge thereof piloting said valve spring.

13. In combination, two axially loaded parts, load transmitting means between said parts restricting said parts against rotation and constituting a spring washer having offset lug portions engaging an adjoining one of said parts to insure axial alignment between the parts and the load transmitting means, spring means between said parts providing a large number of coils each arranged to transmit a portion of the load transversely of the spring and between the parts, said coils engaging said load transmitting means to remove the restriction against rotation in response to increased axial load on the parts, whereupon said coils will tip to rotatably drive one part with respect to the other.

14. In the combination of claim 13, one of said parts comprising a valve spring bottomed against one side of said spring washer, the other of said parts engaging the inside edge of said spring washer, said offset lug portions being at the outer edge of said washer and piloting said valve spring therebetween.

15. In the combination of claim 13, one of said parts comprising a valve spring bottomed against one side of said spring washer, the other of said parts engaging the outside edge of said spring washer, said offset lug portions being at the inner edge of said washer to pilot said valve spring therein.

16. In the combination of claim 13, one of said parts comprising a stationary portion of the valve assembly and engaging the outer edges of said spring washer, the other of said parts bottoming said valve spring and engaging the inner edge of said spring washer, said spring means being interposed between said spring washer and said other part, said offset lug portions being at the outer edge of said spring washer and engaging said other part at the periphery thereof to retain the parts in assembly.

References Cited in the file of this patent

UNITED STATES PATENTS 2,758,583   Norton ------------------ Aug. 14, 1956